United States Patent
Mauri

[19]

[11] Patent Number: 5,856,897
[45] Date of Patent: Jan. 5, 1999

[54] SELF-BIASED DUAL SPIN VALVE SENSOR

[75] Inventor: Daniele Mauri, San Jose, Calif.

[73] Assignee: International Business Machines Corporation, Armonk, N.Y.

[21] Appl. No.: 979,815

[22] Filed: Nov. 26, 1997

Related U.S. Application Data

[63] Continuation of Ser. No. 757,176, Nov. 27, 1996, Pat. No. 5,768,069.

[51] Int. Cl.$^6$ .......................................................... G11B 5/39
[52] U.S. Cl. .......................................................... 360/113
[58] Field of Search ................................... 360/110, 113, 360/122, 124, 126; 324/252, 207.21; 365/8, 157, 158; 338/32 R, 32 H

[56] References Cited

U.S. PATENT DOCUMENTS

| | | | |
|---|---|---|---|
| 5,408,377 | 4/1995 | Gurney et al. | 360/113 |
| 5,492,720 | 2/1996 | Gill et al. | 427/131 |
| 5,627,703 | 5/1997 | Smith | 360/113 |
| 5,701,222 | 12/1997 | Gill et al. | 360/113 |
| 5,751,521 | 5/1998 | Gill | 360/113 |

*Primary Examiner*—David L. Ometz
*Attorney, Agent, or Firm*—Paik Saber

[57] ABSTRACT

A dual spin valve (DSV) magnetoresistive (MR) sensor has a free magnetic layer disposed between first and second pinned magnetic layers. The first pinned layer has two magnetic sublayers separated from each other by an anti-parallel spacer. The first magnetic sublayer closer to the free layer has a magnetic moment which is smaller than the magnetic moment of the second magnetic sublayer. The net moment of the magnetic sublayers is chosen to be equal to the magnetic moment of the second pinned layer thus creating a flux closure and substantially minimizing the effect of the demagnetizing forces. By creating a flux closure and current induced magnetic fields, the first and second pinned layers' magnetization are fixed. This is in contrast with conventional dual spin valve sensors using two anti-ferromagnetic layers to pin the magnetization of the pinned layers.

16 Claims, 6 Drawing Sheets

SELF-BIASED DUAL SPIN VALVE SENSOR

This is a continuation of application Ser. No. 08/757,176 filed on Nov. 27, 1996, U.S. Pat. No. 5,768,069.

BACKGROUND OF THE INVENTION

1. Technical Field

This invention relates in general to a direct access storage device (DASD) of the type utilizing dual spin valve magnetoresistive sensors for reading signals recorded in a magnetic medium and, more particularly, it relates to a DASD having a self-biased dual spin valve sensor.

2. Description of the Background Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced information tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

One type of MR sensor currently under development is giant magnetoresistive (GMR) sensors manifesting the GMR effect. In the GMR sensors, the resistance of the MR sensing layer varies as a function of the spin-dependent transmission of the conduction electrons between the magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material (e.g., NiFe or Co or NiFe/Co) separated by a layer of GMR promoting non-magnetic metallic material (e.g., copper) are generally referred to as spin valve (SV) sensors. In an SV sensor, one of the ferromagnetic layers, referred to as the pinned layer, has its magnetization typically pinned by exchange coupling with an antiferromagnetic (e.g., NiO or FeMn) layer. The pinning field generated by the antiferromagnetic (AFM) layer is usually equal or greater than 200 Oersteds (Oe) so that the magnetization direction of the pinned layer remains fixed during the application of external fields (e.g., fields from bits recorded on the disk). The magnetization of the other layer, referred to as the free layer (free magnetic layer), however, is fixed and is free to rotate in response to the field from the disk.

FIG. 1 shows a prior art SV sensor 100 comprising end regions 104 and 106 separated by a central region 102. A free layer (free MR layer) 110 is separated from a pinned layer (pinned MR layer) 120 by a non-magnetic, electrically-conducting spacer layer 115. The magnetization of the pinned layer 120 is fixed through exchange coupling with an antiferromagnetic (AFM) layer 125. Free layer 110, spacer layer 115, pinned layer 120 and the AFM layer 125 are all formed in the central region 102. Hard bias layers 130 and 135 formed in the end regions 104 and 106, respectively, provide longitudinal bias for the MR free layer 110 and the pinned layer 120. Leads 140 and 145 formed over hard bias layers 130 and 135, respectively, provide electrical connections for the flow of the sensing current $I_s$ from a current source 160 to the MR sensor 100.

The SV effect, i.e., the net change in resistance, exhibited by a typical prior art SV sensor is about 3% to 4.5%. U.S. Pat. No. 5,206,590 entitled "Magnetoresistive Sensor Based On The Spin Valve Effect", granted to Dieny et al. on Apr. 27, 1993, discloses an MR sensor operating on the basis of the spin valve effect.

Referring to FIG. 2, there is shown another type of spin valve sensor commonly referred to as dual spin valve sensor 200, comprising end regions 204 and 206 separated by a central region 202. A free layer (free MR layer) 210 is separated from two outer pinned (pinned MR layer) layers 220 (PL1) and 230 (PL2) by two SV promoting spacer layers 240 and 250, respectively. The magnetization of the first pinned layer 220 is fixed through exchange coupling with a first antiferromagnetic (AFM1) layer 225. The magnetization of the second pinned layer 230 is fixed through exchange coupling with a second antiferromagnetic (AFM) layer 235 (AFM2). Free layer 210, spacer layers 240 and 250, pinned layers 220 and 230 and the AFM layers 225 and 235 are all formed in the central region 202. Hard bias layers 260 and 270 formed in the end regions 204 and 206, respectively, longitudinally bias the MR free layer 210. Leads 280 and 290 formed over hard bias layers 260 and 270, respectively, provide electrical connections for the flow of the sensing current $I_s$ from a current source (not shown) to the MR sensor 200.

Referring to FIG. 2, the magnetization directions of PL1 and PL2 are arranged in such a way that a rotation of the free layer magnetization generates an SV signal of equal sign across the SV promoting spacers, leading to a larger SV effect in dual spin valve sensors as compared to the SV effect in the spin valve sensor of FIG. 1. For example, a dual spin valve sensor having a 70 angstrom thick free layer exhibits an SV effect of about 3.6%–5.5% in comparison to an SV effect of about 3%–4.5% for a single spin valve sensor of the same thickness free layer.

However, there are several significant problems associated with the typical dual SV sensor of FIG. 2.

First, a typical prior art dual SV sensor requires two antiferromagnetic layers (AFM1 and AFM2)with sufficiently large exchange bias fields (usually greater than 200 Oe) in order to pin PL1 and PL2. However, in practice it is difficult to have sufficiently large exchange bias fields for pinning the pinned layers because exchange bias fields magnitude changes significantly depending on whether the ferromagnetic layer is deposited on the AFM layer (PL1 220 on AFM1 225) or the AFM layer is deposited on the ferromagnetic layer (AFM2 235 on PL2 230);

second, it is known that in a conventional spin valve sensor (FIG. 1), the stray field from the pinned layer causes a nonuniform magnetization distribution in the free layer leading to approximately 30% reduction of the linear portion (also referred to as the "usable portion" or "dynamic range") of the SV effect. The added stray field from the second pinned layer in the dual spin valve sensor reduces the SV linear range by approximately 60%, largely offsetting the SV effect advantage of the dual spin valve sensor; and third, prior art dual spin valve sensors require two AFM layers made of FeMn or NiO in order to pin the magnetization of both pin layers by creating pinning fields of about 200 Oe. However, both FeMn and NiO have rather low blocking temperatures (blocking temperature is the temperature at which pinning field for a given material reaches zero Oe) which make their use as an AFM layer difficult and undesirable. Referring to FIG. 3, there is shown the change in the pinning field versus temperature for FeMn having the blocking temperature of about 150° C. (line 310) and NiO having the blocking temperature of about 200° C. (line 320). Considering that a typical SV sensor used in a DASD should be able to operate at a constant temperature of about 120° C. at a pinning field of about 200 Oe, it can readily be seen that FeMn substantially loses it ability to pin the pinned layer at about 120° C. and NiO can marginally provide adequate pinning at about 120° C. It should be noted that once the pinning effect is lost, the SV sensor loses its SV effect either totally or partially rendering the SV sensor useless. FeMn is also very prone to corrosion which makes its use as an AFM layer even more problematic than NiO.

Therefore, there is a need for an invention in which pinned layers' magnetization cancel each other out and further discloses a means for pinning the magnetization of the pinned layers in a dual SV sensor without utilizing an antiferromagnetic layer, thus eliminating the dual SV sensor operation on the temperature sensitivity of the AFM layers.

SUMMARY OF THE INVENTION

It is an object of the present invention to disclose a dual spin valve sensor capable of operating at high temperatures (above 120° C.) without a loss in the SV effect caused by the reduction in the magnetic pinning field.

It is another object of the present invention to disclose a dual spin valve sensor which does not use an antiferromagnetic layer for the purpose of pinning the magnetization of the pinned layers.

It is yet another object of the present invention to disclose a dual spin valve sensor where the magnetizations of the two pinned layers cancel each other out.

This and other objects and advantages are attained in accordance with the principles of the present invention by a self-biased dual spin valve (DSV) sensor having a free layer disposed between two pinned layers where an antiparallel coupling layer is utilized to split any of the three magnetic layers into two antiparallel sublayers in order to provide a flux closure for canceling the magnetizations of the two pinned layers while keeping the SV effect additive in both spacers as well as utilizing current induced pinning in order to eliminate the AFM layers.

In the preferred embodiment, the DSV comprises end regions separated from each other by a central region. The DSV sensor further has a free layer separated from a first pinned (pinned1) layer by a first spacer (spacer1) layer. The pinned1 layer further comprises two ferromagnetic sublayers (pinned1A and pinned1B sublayers) separated from each other by an antiparallel spacer. Pinned1A sublayer, which is disposed between the free layer and the pinned1B sublayer, has a magnetic moment which is smaller than the magnetic moment of the pinned1B sublayer. Pinned1 layer further has a magnetic moment which is the net magnetic moment of the two ferromagnetic sublayers.

Antiparallel spacer is made of non-magnetic material such as ruthenium (Ru), which in the appropriate thickness ranges (preferably between 2 to 8 Å) provides a large antiferromagnetic (antiparallel) coupling between adjacent ferromagnetic layers. This antiferromagnetic coupling is strong enough to maintain antiparallel alignment of the adjacent ferromagnetic layers' (pinned1A and pinned1B) magnetizations, even in the presence of large external fields.

The free layer is also separated from a second pinned (pinned2) layer by a second spacer (spacer2) layer. The second pinned layer has a second magnetic moment. The net magnetic moment of the first pinned layer and the magnetic moment of the second pinned layer are further set (through the selection of proper thickness) to be equal. The free layer is sandwiched between the first and second spacer layers. The free layer together with the first and second spacer layers are further sandwiched between the first and second pinned layers. The free layer, the first and second spacer layers and the first and second pinned layers are all formed in the central region and are referred to as the DSV element (material).

Longitudinal bias layers formed in the end regions provide longitudinal biasing for the free layer. Each longitudinal bias layer further forms a contiguous junction with the DSV element. The DSV sensor further has two leads (first and second DSV leads, also referred to as DSV leads) formed on said longitudinal bias layers for providing sense current to the DSV element.

The first and second spacer materials are chosen from a class of materials that promote SV effect such as copper, silver or gold. These materials produce a ferromagnetic coupling in between the neighboring magnetic layers favoring parallel alignment of their magnetizations.

In the absence of sense current (no sense current applied to the DSV sensor), the magnetization of the free layer, pinned1A sublayer and pinned2 layer are set to be parallel with each other, in the same direction and in parallel with the air bearing surface (air bearing surface (ABS) refers to the surface of the magnetic head, including the DSV sensor, adjacent the magnetic disk surface). The above magnetic states are achieved through balancing the strength and direction of the longitudinal bias field, the magnetic initialization procedure (i.e., temporary application of a large field in a particular orientation), and the strength of the magnetic coupling across the various spacers. In the absence of sense current, the magnetization of the pinned1B sublayer is also set to be parallel with the. ABS and antiparallel with the pinned1A sublayer through the use of the antiparallel spacer.

In the presence of the sense current. (sense current applied to the DSV sensor), pinned1A and pinned2 magnetizations rotate by about 90 degrees toward the ABS to become substantially perpendicular to the ABS while pinned1B magnetization rotate by about 90 degrees away from the ABS to become substantially perpendicular to the ABS. The above magnetization states (substantially perpendicular to the ABS) are achieved through: (1) utilizing current induced magnetic fields; (2) ensuring that the net magnetic moment for the first pinned layer is substantially equal to the magnetic moment for the second pinned layer ("substantially equal" means that the difference between the net magnetic moment of the first pinned layer and the magnetic moment of the second pinned layer is less than the magnetic moment of a 20 Å thick permalloy); and (3) ensuring, through proper thickness selection, that the pinned1A sublayer moment is larger than the pinned1B magnetic moment.

In the presence of the sense current (sense current applied to the DSV sensor) and in the absence of external fields from the disk, the magnetization of the free layer is also made to remain parallel with the ABS by utilizing any combination of the following known factors: (1) adjusting the coupling fields between the free and pinned1A and pinned2 layers through first and second spacer thicknesses; (2) adjusting the thickness and resistivity of the various layers constituting the DSV material in order to modify the distribution of the sense current through the DSV sensor and therefore the current induced field acting on the free layer; (3) creating an imbalance between the net moment of the first pinned layer and the moment of the second pinned layer (the magnetic imbalance between the net magnetic moment of the first pinned layer and the magnetic moment of the second pinned layer must be less than the magnetic moment of a 20 Å thick permalloy); and (4) positioning the sensor asymmetrically between the shields.

The use of the flux closure (i.e., pinned layers' magnetizations canceling each other out) in combination with the sense current induced pinning as a means of pinning the magnetizations of the pinned layers eliminates the sensor operation dependency on the AFM layers; it provides a dynamic means for pinning the pinned layers in the case that the sensor becomes inoperative due to sudden change in temperature or sudden impact with the disk; and at the same time stray fields acting on the edges of the free layer are substantially eliminated due to cancellation of the equal magnetic moments between the pinned layers.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
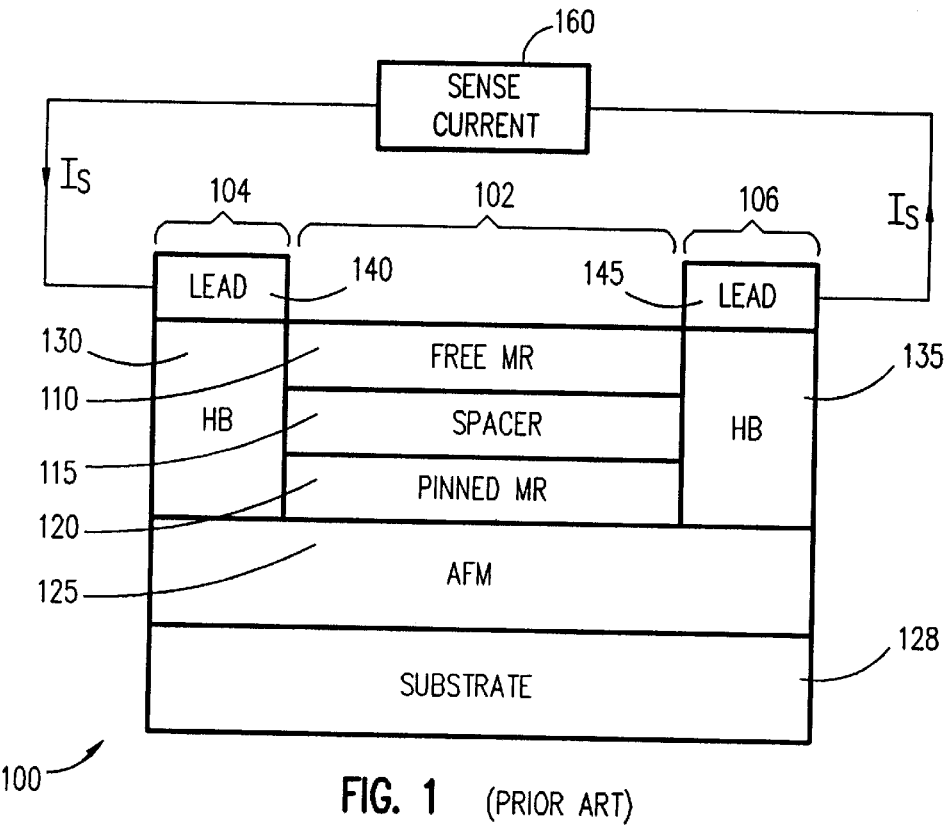
FIG. 1 is an air bearing surface view, not to scale, of a prior art SV sensor using an antiferromagnetic layer.
Figure 2:
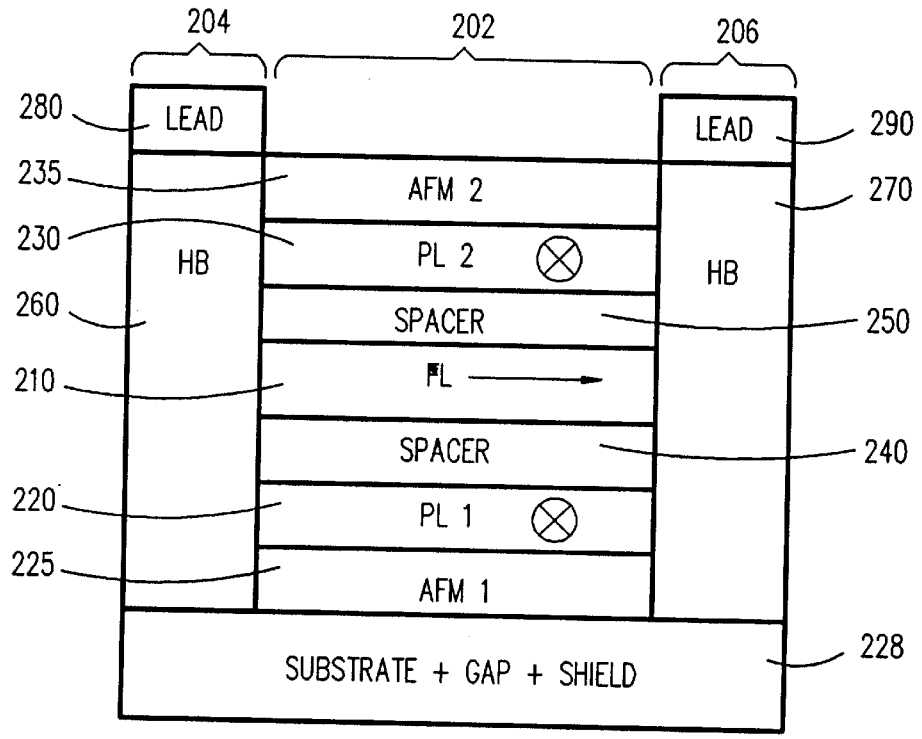
FIG. 2 is an air bearing surface view, not to scale, of a prior art DSV sensor using two antiferromagnetic layers.
Figure 3:
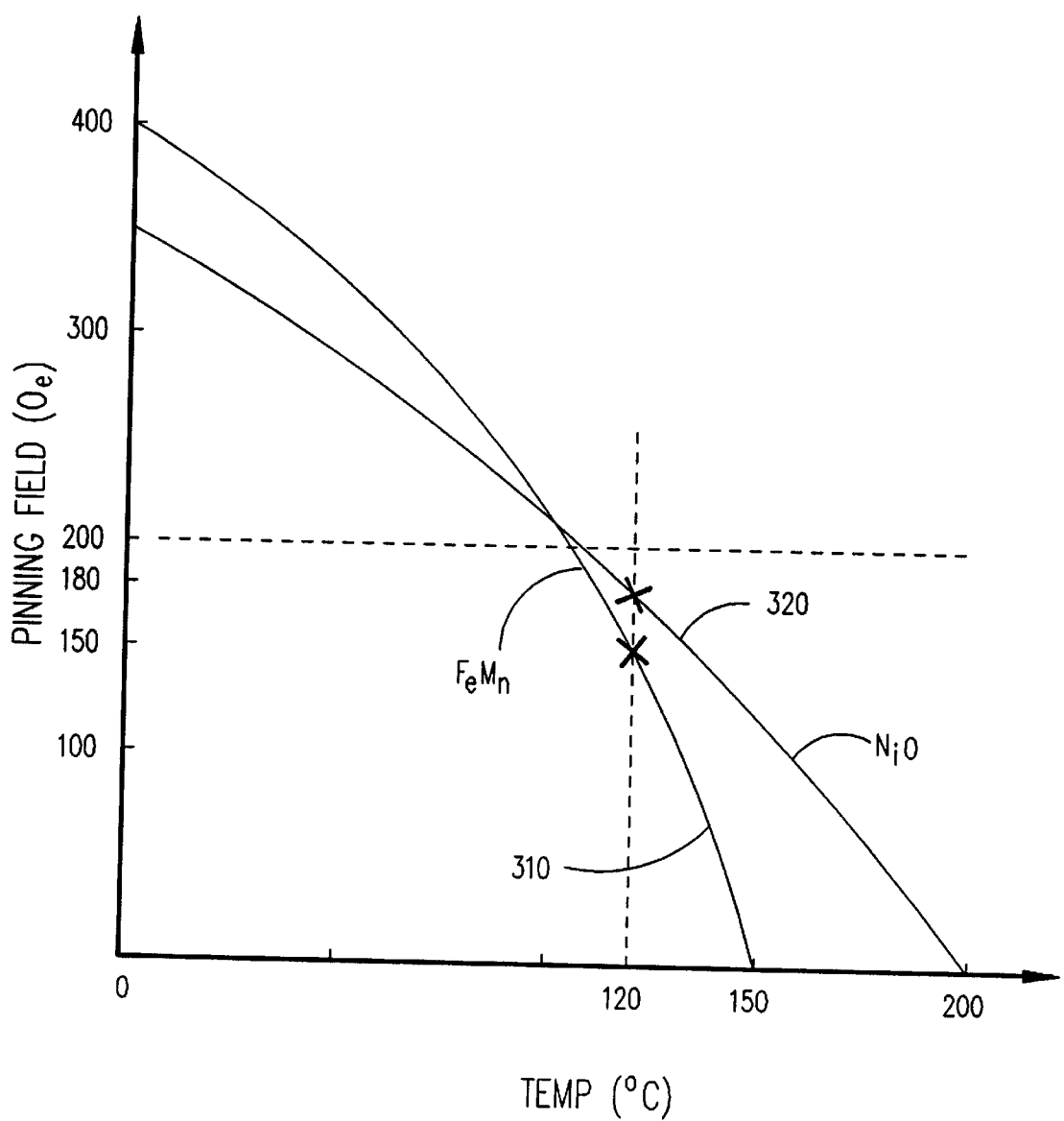
FIG. 3 is a graph showing the relation between the pinning field and the temperature for FeMn and NiO.
Figure 4:
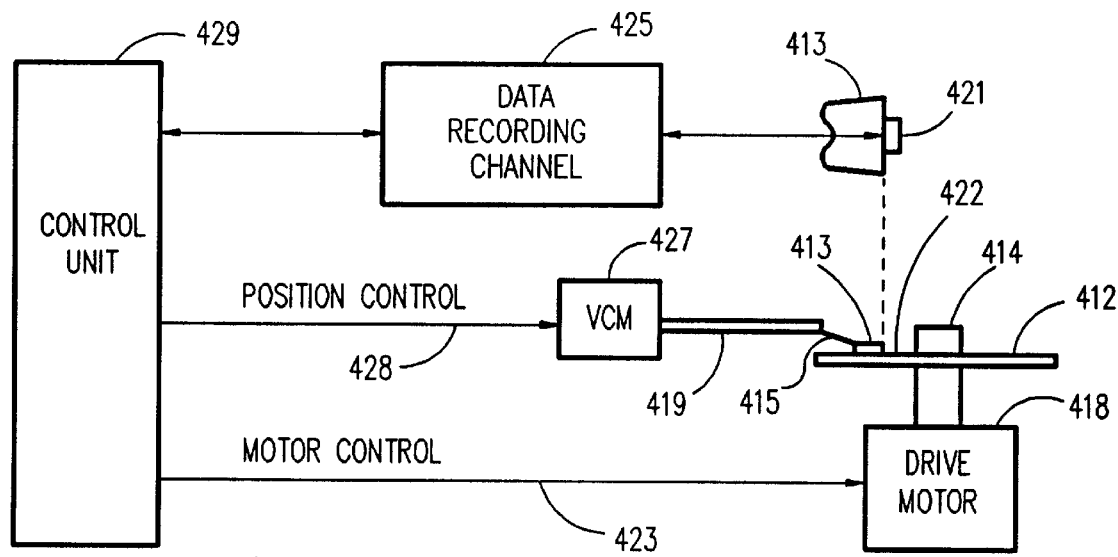
FIG. 4 is a simplified diagram of a magnetic disk storage system embodying the present invention.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording media on each disk is in the form of an annular pattern of concentric data tracks (not shown) on disk 412.

At least one slider 413 is positioned on the disk 412, each slider 413 supporting one or more magnetic read/write heads 421 where the head 421 incorporates the MR sensor of the present invention. As the disks rotate, slider 413 is moved radially in and out over disk surface 422 so that heads 421 may access different portions of the disk where desired data is recorded. Each slider 413 is attached to an actuator arm 419 by means of a suspension 415. The suspension 415 provides a slight spring force which biases slider 413 against the disk surface 422. Each actuator arm 419 is attached to an actuator means 427. The actuator means as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by means of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

Figure 5:
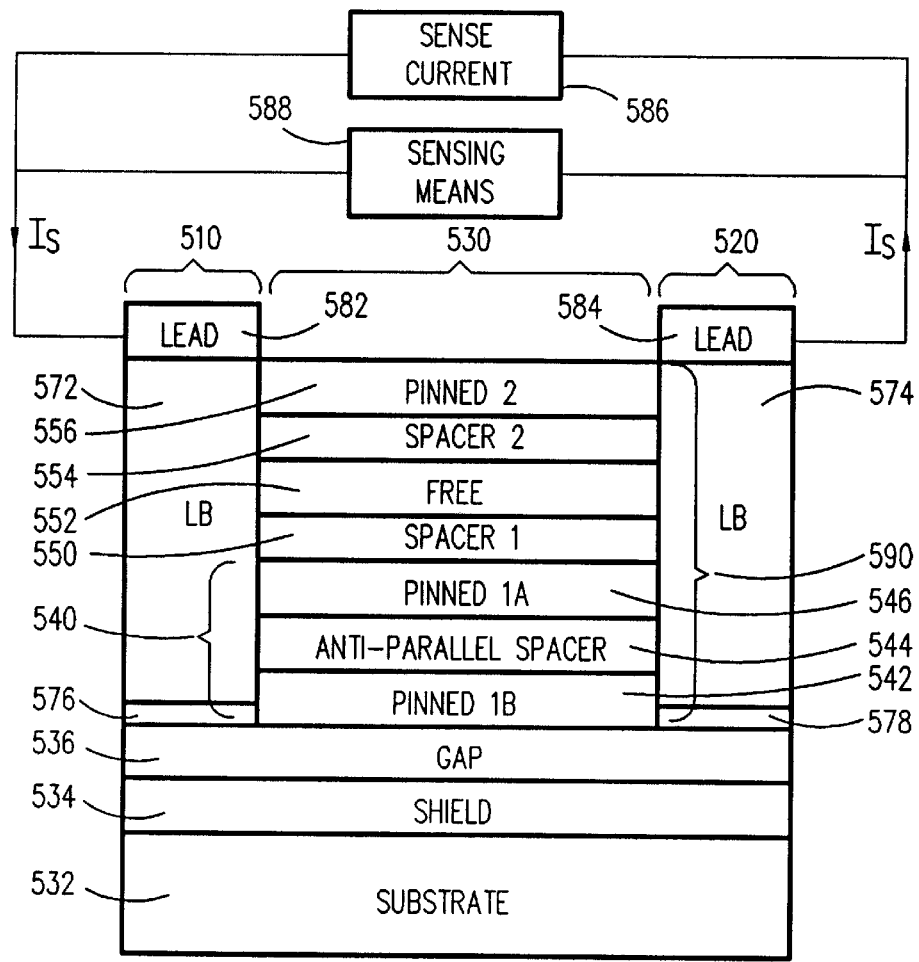
FIG. 5 is an air bearing surface view, not to scale, of the DSV sensor of the preferred embodiment of the present invention.

Now referring to FIG. 5, there is shown an air bearing surface view, not to scale, of a dual spin valve (DSV) sensor 500 of the preferred embodiment of the present invention. DSV sensor 500 comprises passive end regions 510 and 520 separated from each other by a central active region 530. A first magnetic shield layer 534 and a gap layer 536 are preferably, although not necessarily, formed on a suitable substrate 532. Shield layer 534 provides magnetic insulation for the DSV sensor 500 and is typically made of NiFe or sendust (TM). Gap layer 536 provides electrical insulation for the DSV sensor 500 and is generally made of $Al_2O_3$ or $SiO_2$. The DSV sensor 500 further comprises a first pinned layer 540, spacer1 550, free layer 552, spacer2 554 and second pinned layer 556 formed in that order in the central region 530 over the gap layer 536. The free layer 552, the spacer layers 550 and 554, and the first and second pinned layers 540 and 556 are referred to as the DSV element (material) 590.

First pinned layer 540 further comprises first and second ferromagnetic sublayers 542 (pinned1B sublayer) and 546 (pinned1A sublayer) separated from each other by an antiparallel spacer 544.

SV sensor 500 further comprises longitudinal bias (LB) layers 572 and 574 which are formed in the end regions 510 and 520, respectively, for providing a longitudinal bias field to the free layer 552 to ensure a single magnetic domain state in the free layer. In the preferred embodiment, longitudinal biasing layers 572 and 574 are preferably made of hard magnetic material such as CoPtCr although they may also be made of other Co based hard magnet material such as CoPtCrTa or $CoPtCrSiO_2$. Longitudinal biasing layers 572 and 574 are also generally formed over underlayers 576 and 578 formed in end regions 510 and 520, respectively. The underlayers 576 and 578 are generally made of Cr, CrV or Ru. Layers 572 and 574 made of hard magnetic material are generally referred to as hard bias (HB) layers 572 and 574. Each longitudinal bias layer further forms a contiguous junction with the DSV element 590.

Alternatively, longitudinal biasing may be accomplished through exchange coupling each of the 572 and 574 layers comprising soft magnetic material with a layer of antiferromagnetic (AFM) material formed in each end region. In this configuration, soft bias layers 572 and 574 are magnetically hardened as a result of exchange coupling with an AFM layer.

DSV sensor 500 further comprises two electrical leads 582 and 584 (first and second SV leads) formed in the end regions 510 and 520, respectively, to provide electrical connection between the DSV element and a sense current source 586 and a sensing means 588. Sense current source 586 provides the necessary sense current to the DSV element 590 to establish the DC base (bias) voltage across the DSV element 590. Sensing means 588 provides the means for sensing the spin valve effect.

In the DSV 500, free layer 552 is made of soft ferromagnetic material such as NiFe or NiFe/Co; pinned1A layer 546, pinned1B layer 542 and pinned2 layer 556 are also made of soft ferromagnetic material, such as NiFe or NiFe/Co; spacer layers 550 and 554 are made of SV promoting materials (SV promoting materials are those producing a ferromagnetic coupling between the neighboring magnetic layers, i.e., a coupling favoring parallel alignment of their magnetizations) such as copper, silver or gold. Antiparallel spacer 544 is made of non-magnetic materials providing strong antiferromagnetic coupling such as Ru (ruthenium), Cr, Ir (iridium) and Rh. Ruthenium, in the appropriate thickness range (preferably between 2 to 8 Å) is capable of providing a large antiferromagnetic coupling between adjacent ferromagnetic layers. This coupling is strong enough to maintain antiparallel alignment of the adjacent layers' magnetizations, even in the presence of large external fields. It is due to this characteristic of the antiparallel spacer 544 that pinned1A sublayer and pinned1B sublayer have antiparallel magnetizations.

Note that DSV sensor 500 does not use any AFM layer in order to pin the magnetization of the pinned layers. Thus a self-biased DSV sensor refers to a DSV sensor which does not use AFM layers in order to pin the magnetization of the pinned layers. DSV sensor 500 is also usually covered by a capping layer (not shown) followed by a second magnetic shield (not shown).

Figure 6:
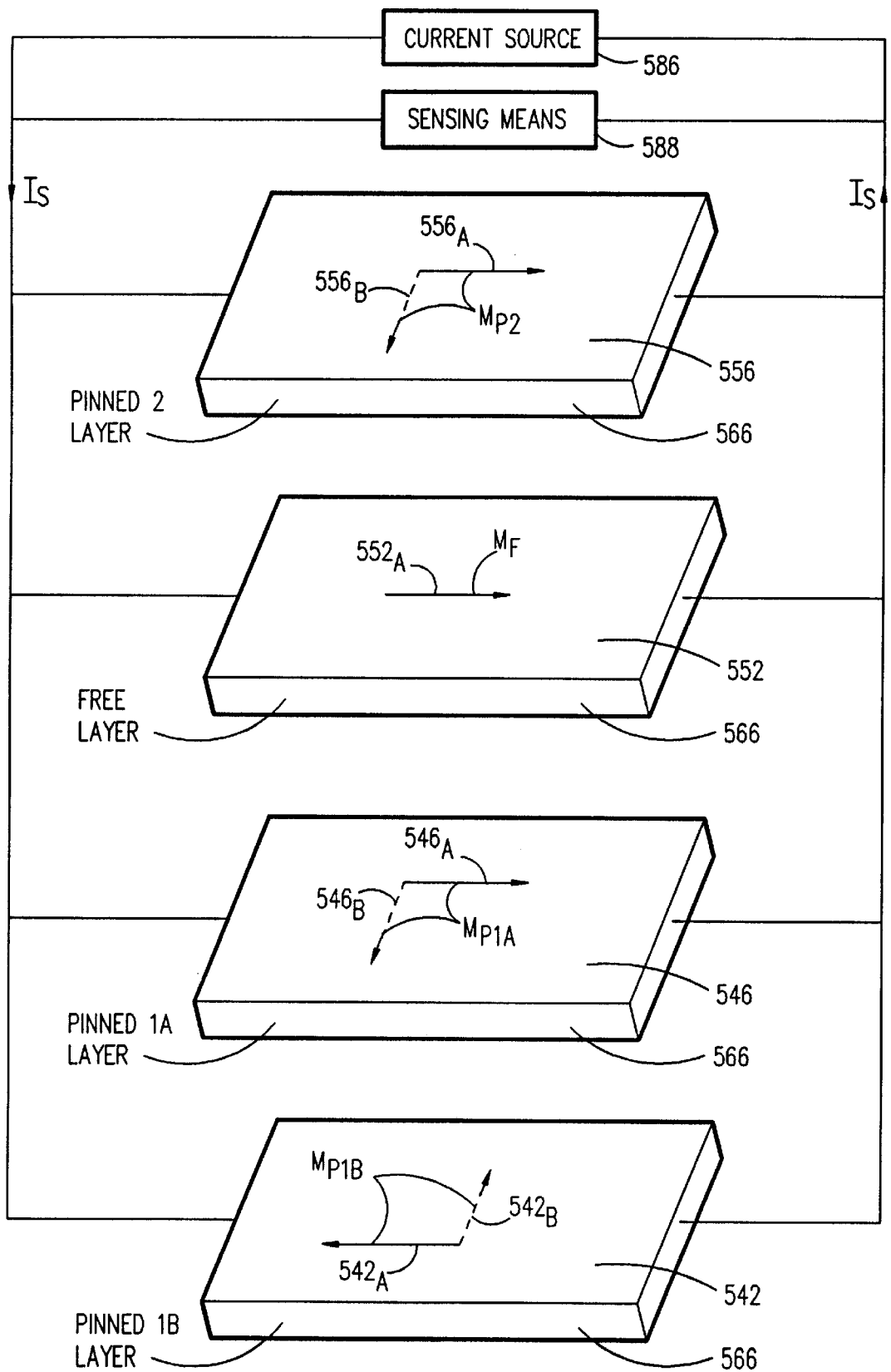
FIG. 6 is a perspective view, not to scale, of the four magnetic layers of the DSV sensor of FIG. 5 and their magnetization vectors in the presence and the absence of the sense current.

Referring to FIG. 6, there is shown a perspective view, not to scale, of the four magnetic layers of the DSV sensor of FIG. 5 and their magnetization vectors in the presence (dashed arrows) and the absence of the sense current (solid arrows). Referring to FIGS. 5 and 6, in the absence of the sense current $I_s$, the magnetization vectors $M_{P2}$, $M_F$ and $M_{P1A}$ of the pinned2 layer 556, free layer 552 and the pinned1A sublayer 546 are set to be parallel with each other, in the same direction and parallel with the ABS 566 (positions $556_A$, $552_A$ and $546_A$, respectively). At the same time, the magnetization vector $M_{P1B}$ of the pinned1B sublayer 542 will be parallel to the ABS 566 but antiparallel with the other three magnetization vectors (position $542_A$)

In the presence of the sense current (i.e., sense current flowing in the DSV sensor 500), the magnetization vector $M_{P2}$ of the second pinned layer 556 rotates from position $556_A$ to position $556_B$ toward ABS 566 and becomes transverse (i.e., substantially perpendicular—forming a 75–105 degree angle) to the ABS 566. This rotation is due to the presence of current induced magnetic fields which vary across the sensor thickness. These fields are perpendicular to the ABS plane, and for a particular current polarity, point towards the ABS in the second pinned layer.

In the presence of the sense current, the magnetization vector $M_{P1A}$ of the pinned1A sublayer 546 also rotates from position $546_A$ to position $546_B$ away from the ABS 566 and becomes transverse (i.e., substantially perpendicular—forming a 105–75 degree angle) to the ABS 566. This rotation is also due to the presence of current induced magnetic fields which vary across the sensor thickness. These fields are perpendicular to the ABS plane and for a particular current polarity, point away from the ABS in the first pinned layer.

In the presence of the sense current, the magnetization vector $M_{P1B}$ of the pinned1B sublayer 542 rotates from position $542_A$ to position $542_B$ away from the ABS 566 and becomes transverse (i.e., substantially perpendicular—forming a 105–75 degree angle) to the ABS 566 due to strong antiparallel magnetization between the two magnetic sublayers.

As mentioned above, the presence of current induces magnetic fields which vary across the sensor thickness. These fields are perpendicular to the ABS plane, and point for a particular current polarity, towards the ABS in the pinned layer 1 and away from the ABS in pinned layer 2. Accordingly, the net moment of the first pinned layer and the moment of the second pinned layer will experience a force tending to orient them antiparallel to each other and perpendicular to the ABS. However, the current induced fields alone are generally not sufficient to produce pinned layers' magnetization alignment perpendicular to the ABS because of demagnetizing forces opposing the perpendicular alignment. Demagnetizing forces, however, are minimized by ensuring that the net magnetic moment of the first pinned layer 540 is substantially equal to the magnetic moment of the second pinned layer 556. First pinned layer net magnetic moment is the resultant of the magnetic moments of the two sublayers. The two sublayers' magnetic moments are dissimilar and chosen so that their difference (i.e., their net combined magnetic moment) is substantially equal to the moment of the second pinned layer. Substantially equal magnetic moment refers to the difference in the magnetic moments which is no larger than the magnetic moment of a strip of 20 Å thick of $Ni_{80}Fe_{20}$ permalloy.

Referring back to FIG. 6, in the presence of sense current and no external magnetic field from the disk, the magnetization vector $M_F$ of the free layer 552 is made to remain parallel (position $552_A$) with the ABS 566 through: (1) adjusting the coupling fields between the free and pinned1A and pinned2 layers by controlling the first and second spacer thicknesses; (2) adjusting the thickness and resistivity of the various layers constituting the DSV material in order to modify the distribution of the sense current through the DSV sensor and therefore the current induced field acting on the free layer; (3) creating an imbalance between the net moment of the first pinned layer and the moment of the second pinned layer; and (4) positioning the sensor asymmetrically between the shields.

As mentioned above, in the presence of the sense current, $M_{P2}$ and $M_{P1A}$ orient themselves toward the ABS 566 and become transverse to the ABS 566 and at the same time they orient themselves to become antiparallel (in opposite direction) with $M_{P1B}$. Furthermore, pinned1B sublayer is chosen to have the larger moment. Consequently the application of a sufficiently large sensing current will produce the magnetic state depicted by the dashed arrows where pinned1B sublayer 542 and the pinned2 layer 556 have magnetizations pointing alternatively towards and away from the ABS. It can be noticed that pinned1A sublayer 546 and pinned2 layer 556 have parallel magnetizations, a condition necessary to ensure that the SV effect across the spacer1 550 and spacer2 554 produce SV signals of the same sign.

The pinned layers' magnetization remains pinned (fixed) in the positions $556_B$, $546_B$, and $542_B$ as long as the sense current is applied to the sensor 500. Once the sensor current is turned off, the pinned layers magnetizations returns to the bias position $556_A$, $546_A$ and $542_A$ in the direction parallel with the ABS 566.

In the preferred embodiment of the present invention, the sense current flowing in the DSV sensor is greater than 5 mA per micron of stripe height (stripe height refers to the height of the MR sensor with reference to the ABS) and the material and the thickness of the layers forming the DSV element are:

pinned1B 546: NiFe(60–100 Å);
antiparallel spacer 544: Ru(4–8 Å);
pinned1A 546: NiFe(20–60 Å);
spacer1 550: Cu(20–30 Å);
free 552: NiFe(40–80 Å);
spacer2 554: Cu(20–30 Å); and
pinned2 556: NiFe(40-80 Å).

Figure 7:
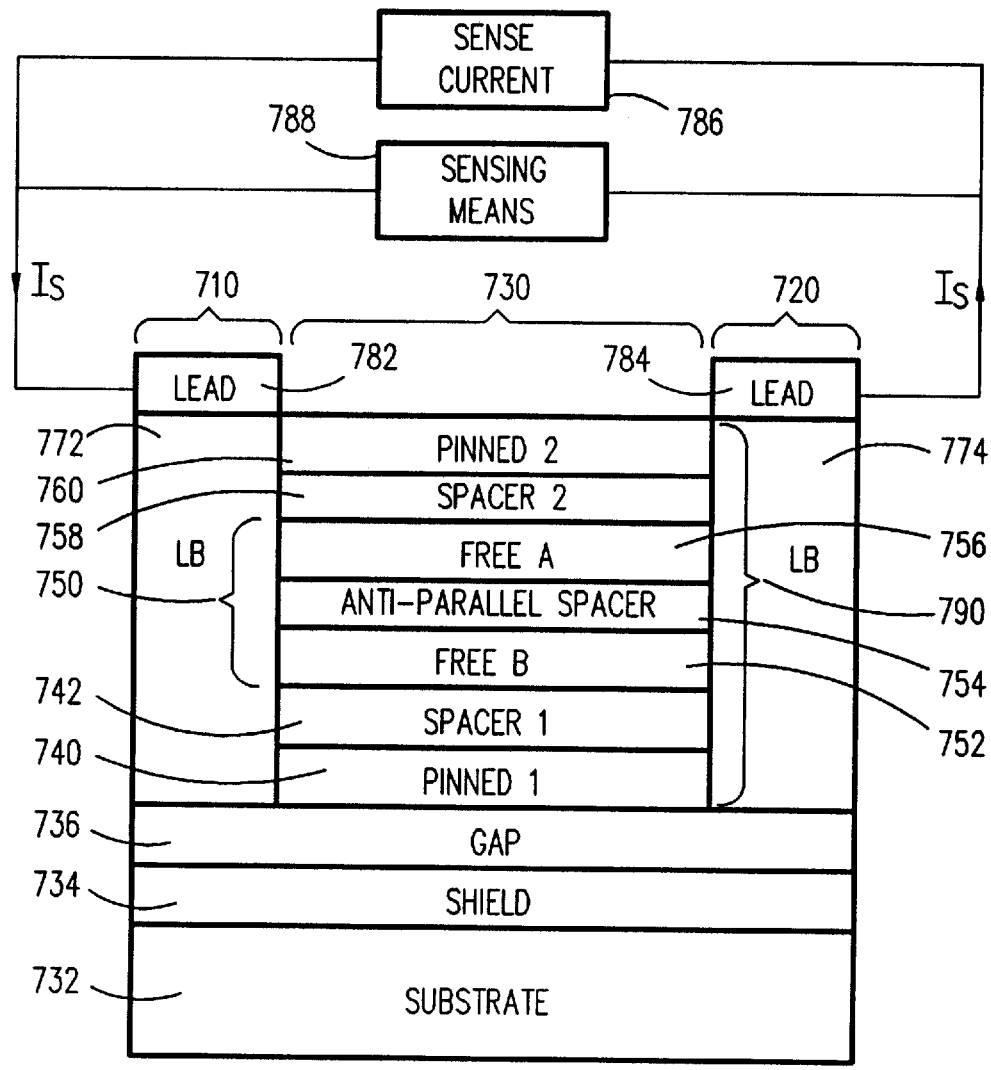
FIG. 7 is an air bearing surface view, not to scale, of an alternative embodiment of the DSV sensor of the present invention.

Now, referring to FIG. 7, there is shown an air bearing surface view of a dual spin valve sensor 700 of an alternative embodiment of the present invention. DSV sensor 700 comprises passive end regions 710 and 720 separated from each other by a central active region 730. A first magnetic shield layer 734 and a gap layer 736 are preferably, although not necessarily, formed on a suitable substrate 732.

The DSV sensor 700 further comprises a first pinned layer 740, spacer1 742, free layer 750, spacer2 758 and second pinned layer 760 formed in that order in the central region 730 over the gap layer 736. The free layer 750, the spacer layers 742 and 758, and the first and second pinned layers 740 and 760 are referred to as the DSV element (material) 790.

Free layer 750 further comprises first and second ferromagnetic sublayers 752 (freeB sublayer) and 756 (freeA sublayer) separated from each other by an antiparallel spacer 754. The magnetic moment of the freeA sublayer is chosen to be different than the magnetic moment of the freeB sublayer which result in the free layer 750 having a non-zero net magnetic moment. The magnitude of the non-zero net magnetic moment is optimized for a particular areal magnetization of the disk, in order to achieve the desired combination of sensitivity and linearity for the sensor. It should be noted that lowering the free layer 750 net magnetic moment improves the sensitivity but degrades the sensor linearity.

DSV sensor 700 further comprises longitudinal bias (LB) layers 772 and 774 which are formed in the end regions 710 and 720, respectively, for providing a longitudinal bias field to the free layer 750 to ensure a single magnetic domain state in the free layer. In the preferred embodiment, longitudinal biasing layers 772 and 774 are preferably made of hard magnetic material such as CoPtCr although they may also be made of other Co based hard magnet material such as CoPtCrTa or $CoPtCrSiO_2$. Layers 772 and 774 made of hard magnetic material are generally referred to as hard bias (HB) layers 772 and 774. Each longitudinal bias layer further forms a contiguous junction with the DSV element 790.

Alternatively, longitudinal biasing may be accomplished through exchange coupling each of the 772 and 774 layers comprising soft magnetic material with a layer of antiferromagnetic (AFM) material formed in each end region. In this configuration, soft bias layers 772 and 774 are magnetically hardened as a result of exchange coupling with an AFM layer.

DSV sensor 700 further comprises two electrical leads 782 and 784 (first and second SV leads) formed in the end regions 710 and 720, respectively, to provide electrical connection between the DSV element and a sense current source 786 and a sensing means 788. Sense current source 786 provides the necessary sense current to the DSV element 790 to establish the DC base (bias) voltage across the DSV element 790. Sensing means 788 provides the means for sensing the spin valve effect.

In the DSV 700, sublayers freeA and freeB are made of soft ferromagnetic material such as NiFe or NiFe/Co; pinned1 740, and pinned2 layer 760 are also made of soft ferromagnetic material, such as NiFe or NiFe/Co; spacer layers 742 and 758 are made of SV promoting materials (SV promoting materials are those producing a ferromagnetic coupling between the neighboring magnetic layers, i.e., a coupling favoring parallel alignment of their magnetizations) such as copper, silver or gold. Antiparallel spacer 754 is made of non-magnetic materials providing strong antiferromagnetic coupling such as Ru(ruthenium), Cr, Ir and Rh. Ruthenium, in the appropriate thickness range (preferably between 2 to 8 Å) is capable of providing a large antiferromagnetic coupling between the freeA 756 and freeB 752 adjacent ferromagnetic layers. This coupling is strong enough to maintain antiparallel alignment of the freeA and freeB magnetizations, even in the presence of large external fields. It is due to this characteristic of the antiparallel spacer 754 that freeA sublayer and freeB sublayer have antiparallel magnetizations.

Note that DSV sensor 700 does not use any AFM layer in order to pin the magnetization of the pinned layers 740 and 760. Thus, the terminology self-biased DSV sensor refers to a DSV sensor which does not use AFM layers in order to pin the magnetization of the pinned layers. DSV sensor 700 is also usually covered by a capping layer (not shown) followed by a second magnetic shield (not shown).

Figure 8:
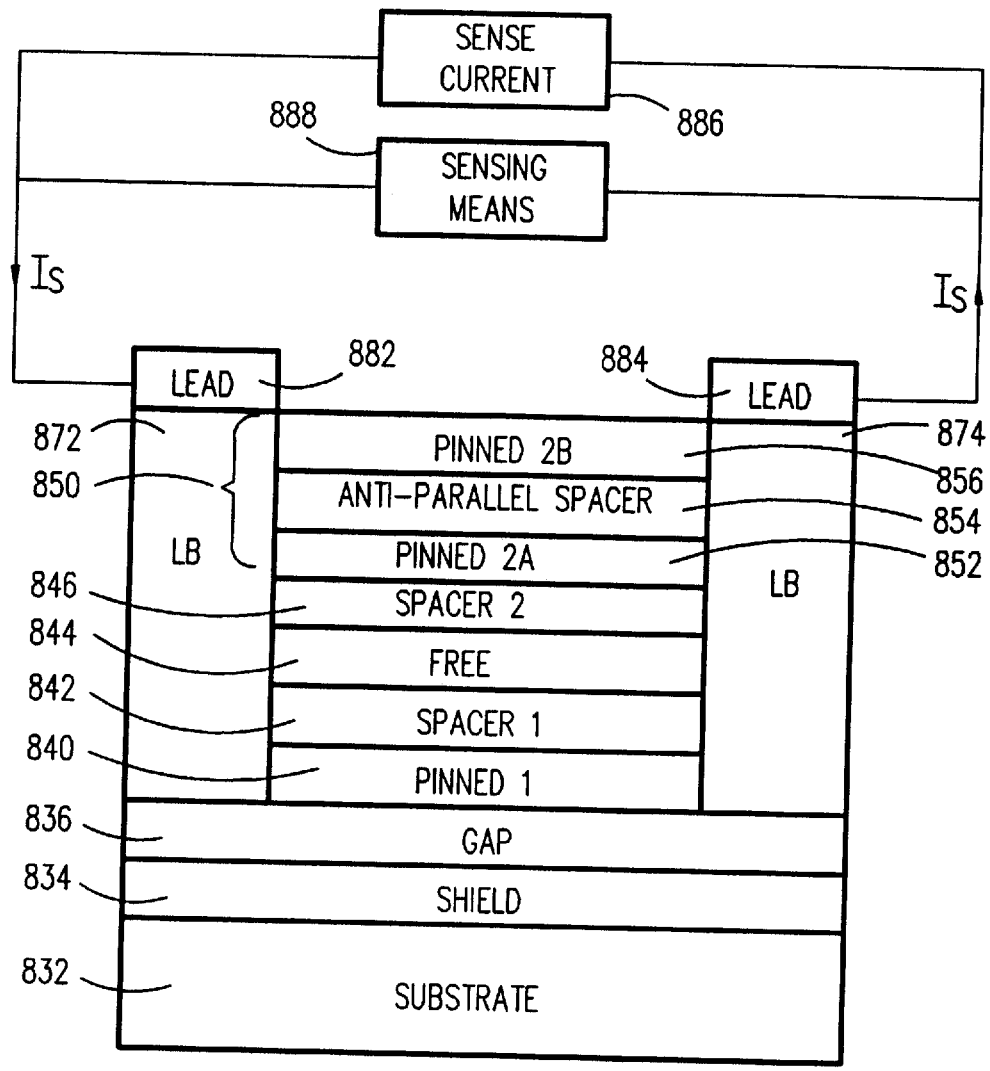
FIG. 8 is an air bearing surface view, not to scale, of another alternative embodiment of the DSV sensor of the present invention.

Now, referring to FIG. 8, there is shown an ABS view of a dual spin valve sensor 800 of another alternative embodiment of the present invention. The DSV sensor 800 is very similar to the DSV sensor 500 except for the second pinned layer 850 having two pinned sublayers 852 and 856 separated from each other by an antiparallel spacer 854.

While the present invention has been particularly shown and described with reference to the preferred embodiment thereof, nevertheless, it will be understood by those skilled in the art that various modifications may be made therein without departing from the spirit, scope, and teaching of the present invention.

Accordingly, it is to be understood that the invention disclosed herein is not to be limited by the illustrated embodiment, but only by the scope of the appended claims.

We claim:

1. A dual spin valve (DSV) sensor having first and second end regions separated from each other by a central region, said DSV sensor comprising:
a DSV element in said central region, said DSV element including:
a free layer, said free layer having:
first and second ferromagnetic sublayers; and
an antiparallel spacer disposed between said first and second ferromagnetic sublayers;
a first pinned layer having a first magnetic moment;
a second pinned layer having a second magnetic moment;
a first non-magnetic spacer layer disposed between said free layer and said first pinned layer; and
a second non-magnetic spacer layer disposed between said free layer and said second pinned layer, said free layer being disposed between said first spacer layer and said second spacer layer;
first and second longitudinal bias layers formed in said first and second end regions, respectively, for longitudinally biasing said free layer, said first and second longitudinal bias layers forming a contiguous junction with said DSV element; and
first and second DSV leads disposed over said first and second longitudinal bias layers, respectively, for applying sense current to said DSV element for pinning the magnetization of said first and second pinned layers.

2. A DSV sensor as recited in claim 1 wherein said first ferromagnetic sublayer is selected from a group of material consisting of NiFe, NiFeCo, NiFe/Co and NiFeCo/Co.

3. A DSV sensor as recited in claim 1 wherein said second ferromagnetic sublayer is selected from a group of material consisting of NiFe, NiFeCo, NiFe/Co and NiFeCo/Co.

4. A DSV sensor as recited in claim 1 wherein said first and second pinned layers are selected from a group of material consisting of NiFe, NiFe/Co, NiFeCr, NiFeNb, Co, NiFe/Co, NiFeCo/Co, NiFeCr/Co and NiFeNb/Co.

5. A DSV sensor as recited in claim 1 wherein said first spacer layer is selected from a group of material consisting of copper, gold, silver and their alloys.

6. A DSV sensor as recited in claim 1 wherein said second spacer layer is selected from a group of material consisting of copper, gold, silver and their alloys.

7. A DSV sensor as recited in claim 1 wherein said antiparallel spacer is selected from a group of material consisting of Ru, Cr, Rh, Ir and their alloys.

8. A DSV sensor as recited in claim 1 wherein said first and second longitudinal bias layers are selected from a group of hard magnetic material consisting of CoPtCr, CoPtCrTa, and $CoPtCrSiO_2$.

9. A DSV sensor as recited in claim 1 wherein said first and second longitudinal bias layers are selected from a group of soft magnetic material consisting of NiFe and NiFeCo, each of said longitudinal bias layers being exchanged with an antiferromagnetic layer, each of said antiferromagnetic layers selected from a group of material consisting of FeMn, NiMn, PtMn, PdMn, IrMn and RhMn.

10. A magnetic storage system, comprising:
a magnetic storage medium for recording data;
a dual spin valve (DSV) sensor having first and second end regions separated from each other by a central region, said DSV sensor comprising:
a DSV element in said central region, said DSV element including:
a free layer, said free layer having:
first and second ferromagnetic sublayers; and
an antiparallel spacer disposed between said first and second ferromagnetic sublayers;
a first pinned layer having a first magnetic moment;
a second pinned layer having a second magnetic moment;
a first non-magnetic spacer layer disposed between said free layer and said first pinned layer; and
a second non-magnetic spacer layer disposed between said free layer and said second pinned layer, said free layer being disposed between said first spacer layer and said second spacer layer;
first and second longitudinal bias layers formed in said first and second end regions, respectively, for longitudinally biasing said free layer, said first and second longitudinal bias layers forming a contiguous junction with said DSV element; and
first and second DSV leads disposed over said first and second longitudinal bias layers, respectively, for applying sense current to said DSV element for pinning the magnetization of said first and second pinned layers; and
a recording channel coupled to said DSV sensor for detecting resistance changes in said DSV element responsive to applied magnetic fields representative of data recorded in said magnetic storage medium.

11. A magnetic storage system according to claim 10, wherein said first and second ferromagnetic sublayers are selected from a group of material consisting of NiFe, NiFeCo, NiFe/Co and NiFeCo/Co.

12. A magnetic storage system according to claim 10, wherein said first and second pinned layers are selected from a group of material consisting of NiFe, NiFe/Co, NiFeCr, NiFeNb, Co, NiFe/Co, NiFeCo/Co, NiFeCr/Co and NiFeNb/Co.

13. A magnetic storage system according to claim 10, wherein said first and second spacer layers are selected from a group of material consisting of copper, gold, silver and their alloys.

14. A magnetic storage system according to claim 10, wherein said antiparallel spacer is selected from a group of material consisting of Ru, Cr, Rh, Ir and their alloys.

15. A magnetic storage system according to claim 10, wherein said first and second longitudinal bias layers are selected from a group of hard magnetic material consisting of CoPtCr, CoPtCrTa, and $CoPtCrSiO_2$.

16. A magnetic storage system according to claim 10, wherein said first and second longitudinal bias layers are selected from a group of soft magnetic material consisting of NiFe and NiFeCo, each of said longitudinal bias layers being exchanged with an antiferromagnetic layer, each of said antiferromagnetic layers selected from a group of material consisting of FeMn, NiMn, PtMn, PdMn, IrMn and RhMn.

* * * * *